United States Patent
Yang et al.

(10) Patent No.: US 7,697,269 B2
(45) Date of Patent: Apr. 13, 2010

(54) HOUSING MECHANISM FOR ELECTRONIC DEVICE

(75) Inventors: Qing Yang, Shenzhen (CN); Chia-Hua Chen, Taipei Hsien (TW)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 756 days.

(21) Appl. No.: 11/616,821

(22) Filed: Dec. 27, 2006

(65) Prior Publication Data

US 2007/0189120 A1    Aug. 16, 2007

(30) Foreign Application Priority Data

Feb. 10, 2006    (CN) .................. 2006 1 0033573

(51) Int. Cl.
G06F 1/16    (2006.01)
(52) U.S. Cl. ................................ 361/679.01
(58) Field of Classification Search ........... 361/679.01; 429/97, 100; 224/257
See application file for complete search history.

(56) References Cited

U.S. PATENT DOCUMENTS

| | | | |
|---|---|---|---|
| 6,983,130 B2 * | 1/2006 | Chien et al. ............... 455/90.3 |
| 7,436,653 B2 * | 10/2008 | Yang et al. ............. 361/679.01 |
| 2003/0095374 A1 * | 5/2003 | Richardson ................. 361/681 |
| 2007/0003827 A1 * | 1/2007 | Zuo et al. ..................... 429/97 |

FOREIGN PATENT DOCUMENTS

| | | |
|---|---|---|
| JP | 6-268724 A | 9/1994 |
| JP | 8-32658 A | 2/1996 |

* cited by examiner

*Primary Examiner*—Lisa Lea-Edmonds
(74) *Attorney, Agent, or Firm*—Steven M. Reiss

(57) ABSTRACT

An exemplary housing mechanism (8) for an electronic device includes a cover (10) and a frame (20). The cover has a cover body (11), a sealing element (12), and a sidewall (13) formed around the cover body. A surface of a distal end of the sidewall is recessed thereby forming a receiving slot (16) therein. The sealing element has a connecting portion (122) and a positioning portion (124) connected to the connecting portion. The connecting portion is fixedly received in the receiving slot of the cover. The frame has a positioning slot (26) defined therein and the positioning portion of the sealing element is for reception in the positioning slot of the frame when the cover is closed to the frame.

17 Claims, 5 Drawing Sheets

HOUSING MECHANISM FOR ELECTRONIC DEVICE

BACKGROUND OF THE INVENTION

1. Field of the Invention

The present invention generally relates to electronic devices and, more particularly, to a housing mechanism for an electronic device configured (i.e., structured and arranged) for preventing water or dust from invading the electronic device.

2. Description of Related Art

With the development of wireless communication and information processing technologies, portable electronic devices such as notebook computers, mobile phones, and personal digital assistants (PDAs) are now in widespread use. These electronic devices enable consumers to enjoy high technology services anytime and anywhere.

Most contemporary electronic devices have little protection against water or dust. If the electronic devices drop into water, the electronic devices cannot be used because water may erode electronic elements of the electronic devices and cause short circuits. Some electronic devices have rubber plugs to protect against water or dust. However, the rubber plugs may easily become lost or fall out as they are small.

Therefore, a new housing mechanism for an electronic device is desired in order to overcome the above-described shortcomings.

SUMMARY OF THE INVENTION

In one aspect, a housing mechanism for an electronic device includes a cover and a frame. The cover has a cover body, a sealing element, and a sidewall formed around the cover body. A surface of a distal end of the sidewall is recessed thereby forming a receiving slot therein. The sealing element has a connecting portion and a positioning portion connected to the connecting portion. The connecting portion is fixedly received in the receiving slot of the cover. The frame has a positioning slot defined therein and the positioning portion of the sealing element is configured for reception in the positioning slot of the frame when the cover is closed to the frame.

Other advantages and novel features will become more apparent from the following detailed description when taken in conjunction with the accompanying drawings.

BRIEF DESCRIPTION OF THE DRAWINGS

Many aspects of the housing mechanism can be better understood with reference to the following drawings. The components in the drawings are not necessarily drawn to scale, the emphasis instead being placed upon clearly illustrating the principles of the present housing mechanism. Moreover, in the drawings, like reference numerals designate corresponding parts throughout the several views.

DETAILED DESCRIPTION OF THE EMBODIMENT

Figure 1:
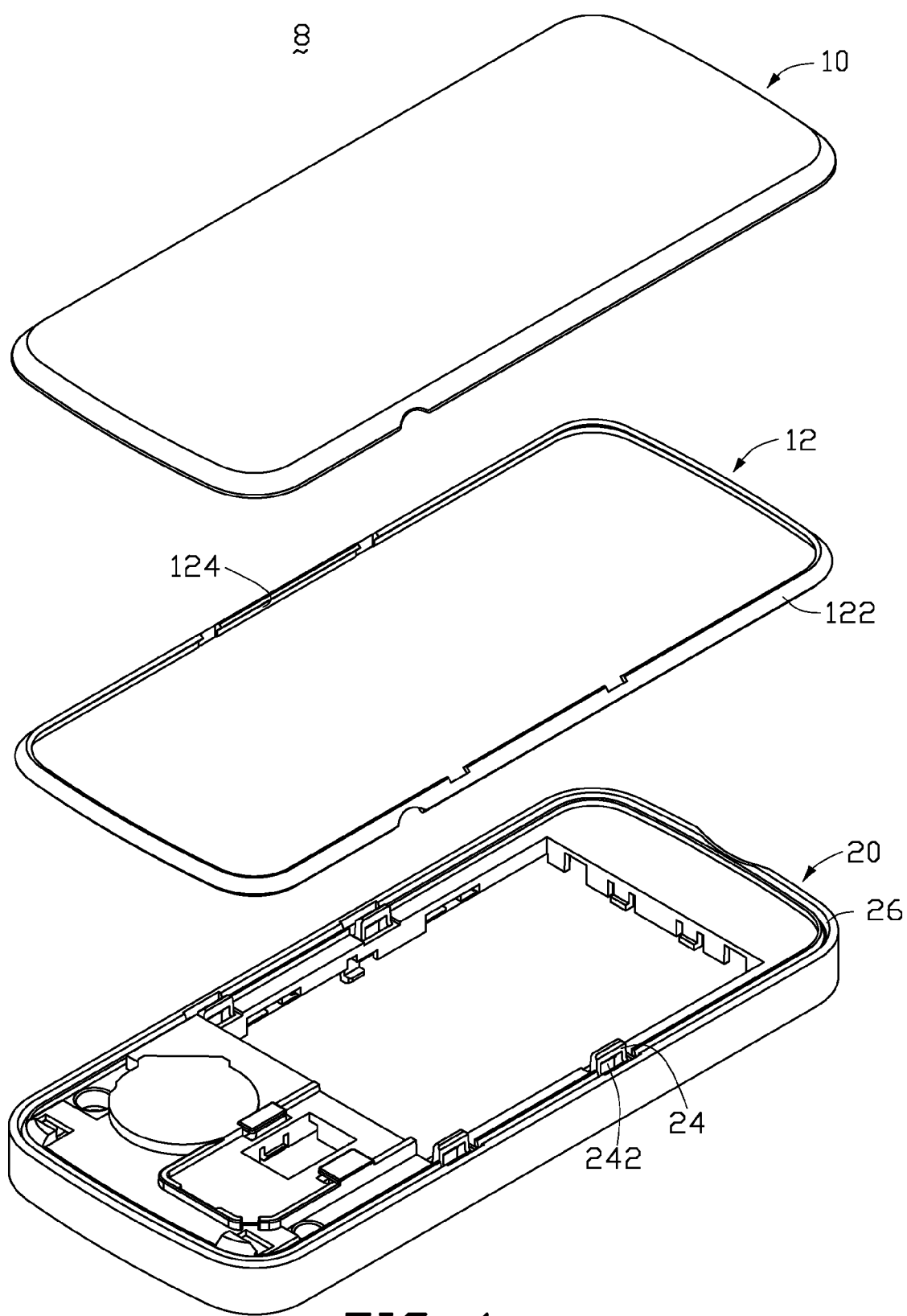
FIG. 1 is an exploded, schematic view of a housing mechanism in accordance with a preferred embodiment.
Figure 2:
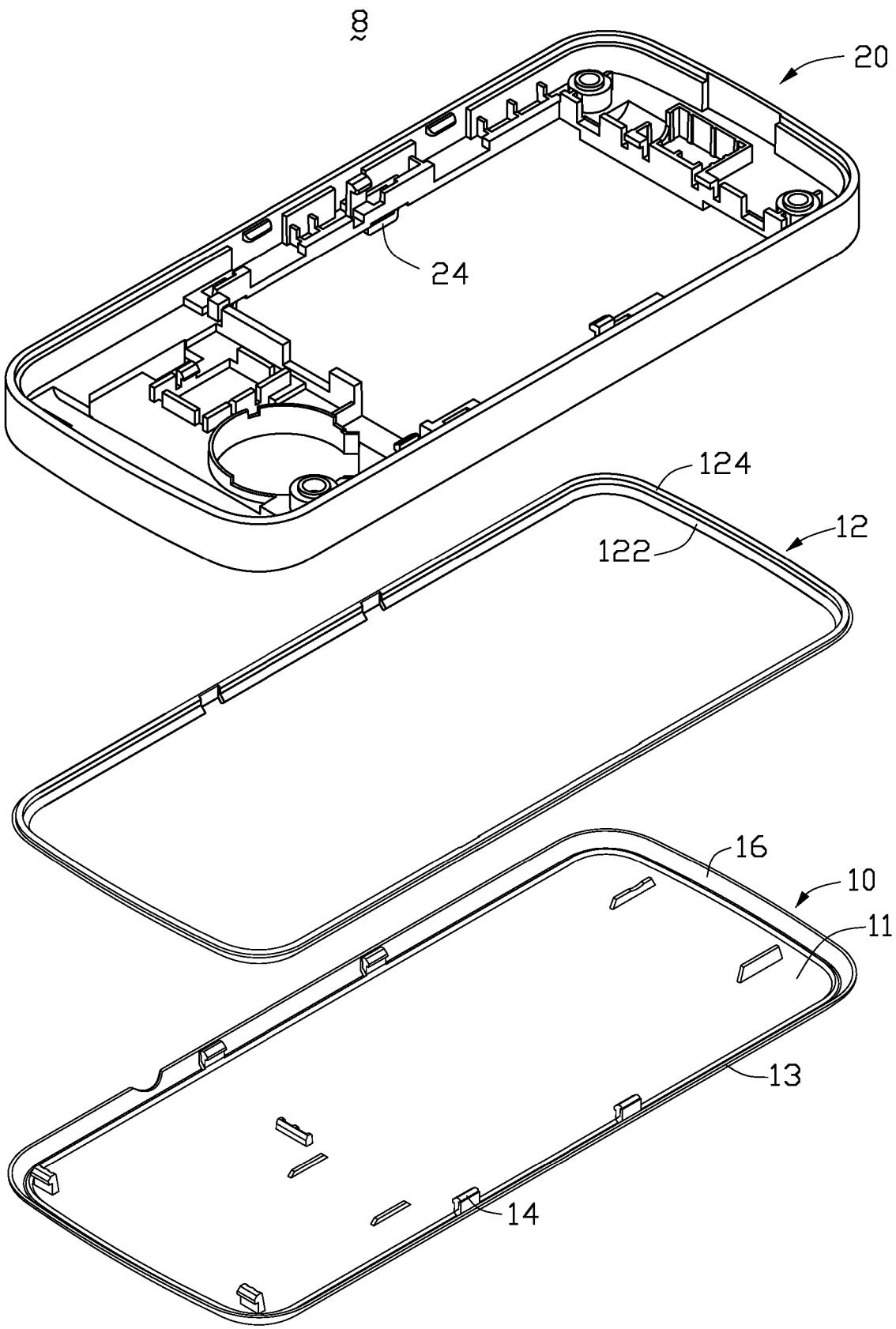
FIG. 2 is similar to FIG. 1 but viewed from another aspect.
Figure 5:
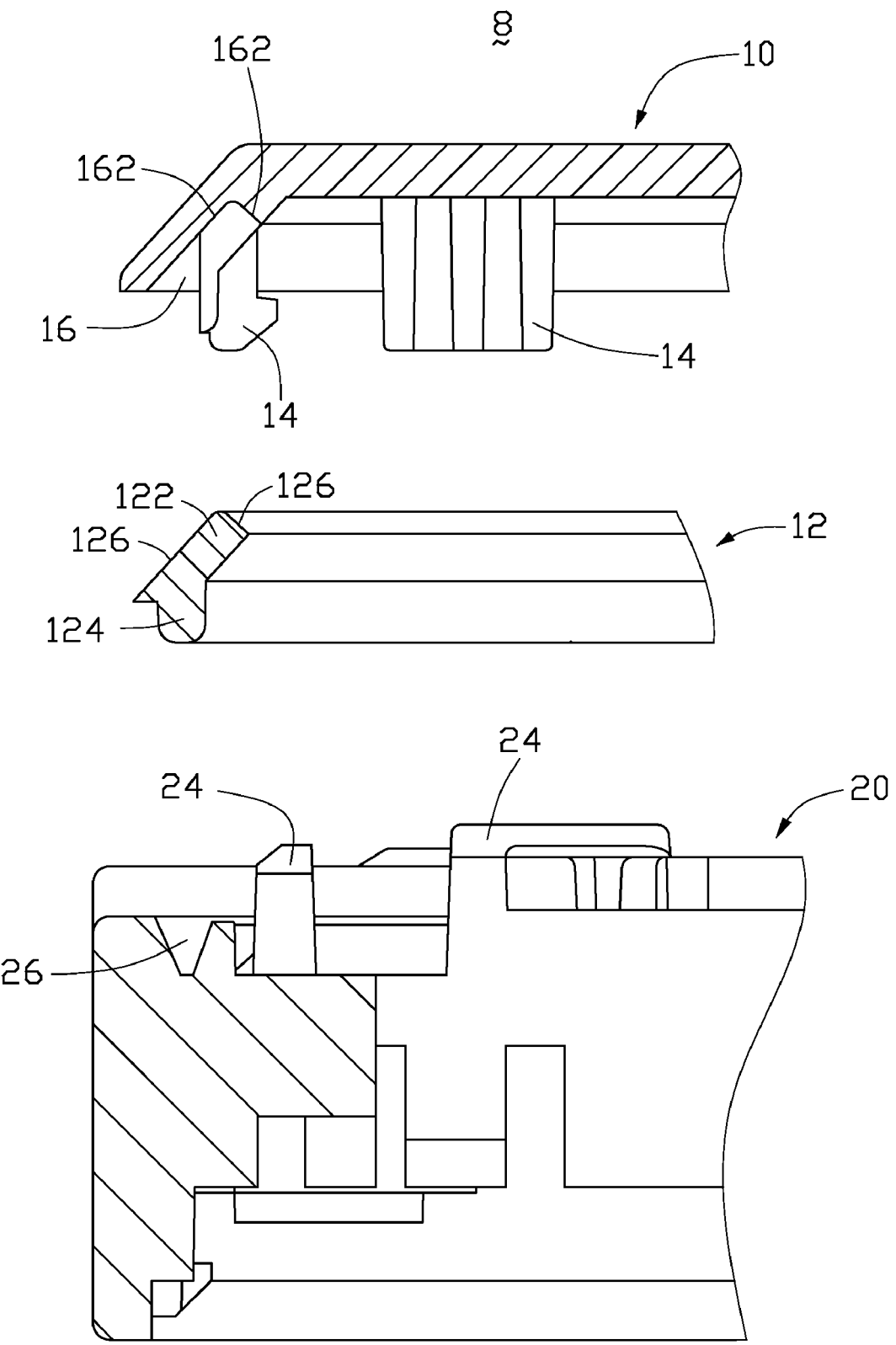
FIG. 5 is a exploded, cross-sectional view of the housing mechanism in FIG. 4.

Referring to FIG. 1, in a preferred embodiment, a housing mechanism 8 for an electronic device, such as a mobile phone, includes a cover 10 and a frame 20. An elastic sealing element 12 is integrally formed with the cover 10. For describing the structure of the housing mechanism 8, FIGS. 1-2 and 5 show exploded views of the housing mechanism 8, though the cover 10 and the elastic sealing element 12 are actually formed together.

Also referring to FIGS. 1-2 and 4-5, the cover 10 includes a cover body 11, the elastic sealing element 12, and a sidewall 13 formed around the cover body 11. The cover body 11 is a rectangular board in shape. A plurality of hooks 14 is formed on the cover body 11 adjacent to the sidewall 13. An inner surface of a distal end of the sidewall 13 away from the cover body 11 is recessed thereby forming two inclined surfaces 162. The two surfaces 162 are inclined at an angle relative to each other thereby forming a receiving slot 16 therebetween.

The sealing element 12 is a substantially quadrate hollow element and has a connecting portion 122 and a positioning portion 124 connected to the connecting portion 122 in a cross section thereof. The connecting portion 122 has two connecting surfaces 126. The two connecting surfaces 126 are inclined at an angle relative to each other. The connecting portion 122 is formed in the receiving slot 16 of the cover 10. Each connecting surface 126 abuts one corresponding inclined surface 162 of the cover 10. The connecting portion 122 and the positioning portion 124 are inclined at an angle relative to each other. The positioning portion 124 is substantially pillar-shaped. The sealing element 12 may advantageously be made of an elastic thermoplastic, such as thermoplastic urethanes (TPU). The sealing element 12 can also be made of elastic rubber.

The frame 20 is rectangular in shape. The frame 20 has a positioning slot 26 defined therein. The positioning slot 26 has a substantially V-shaped cross section. The positioning portion 124 of the sealing element 12 is configured for reception in the positioning slot 26. A plurality of projections 24 is formed on the frame 20 adjacent to the positioning slot 26. Each projection 24 defines a groove 242 therein. Each hook 14 is configured for reception in one corresponding groove 242.

The cover body 11, the sidewall 13, and the frame 20 may advantageously be made of a plastic material. The plastic material can be polyvinyl chloride, polyethylene terephthalate, acrylonitrile-butadiene-styrene, polycarbonate, polyimide, liquid crystal polymer, polyetherimide, polyphenylene sulfide, polysulfone, polystyrene, glycol-modified polyester, polypropylene, or any desired combination thereof.

Figure 3:
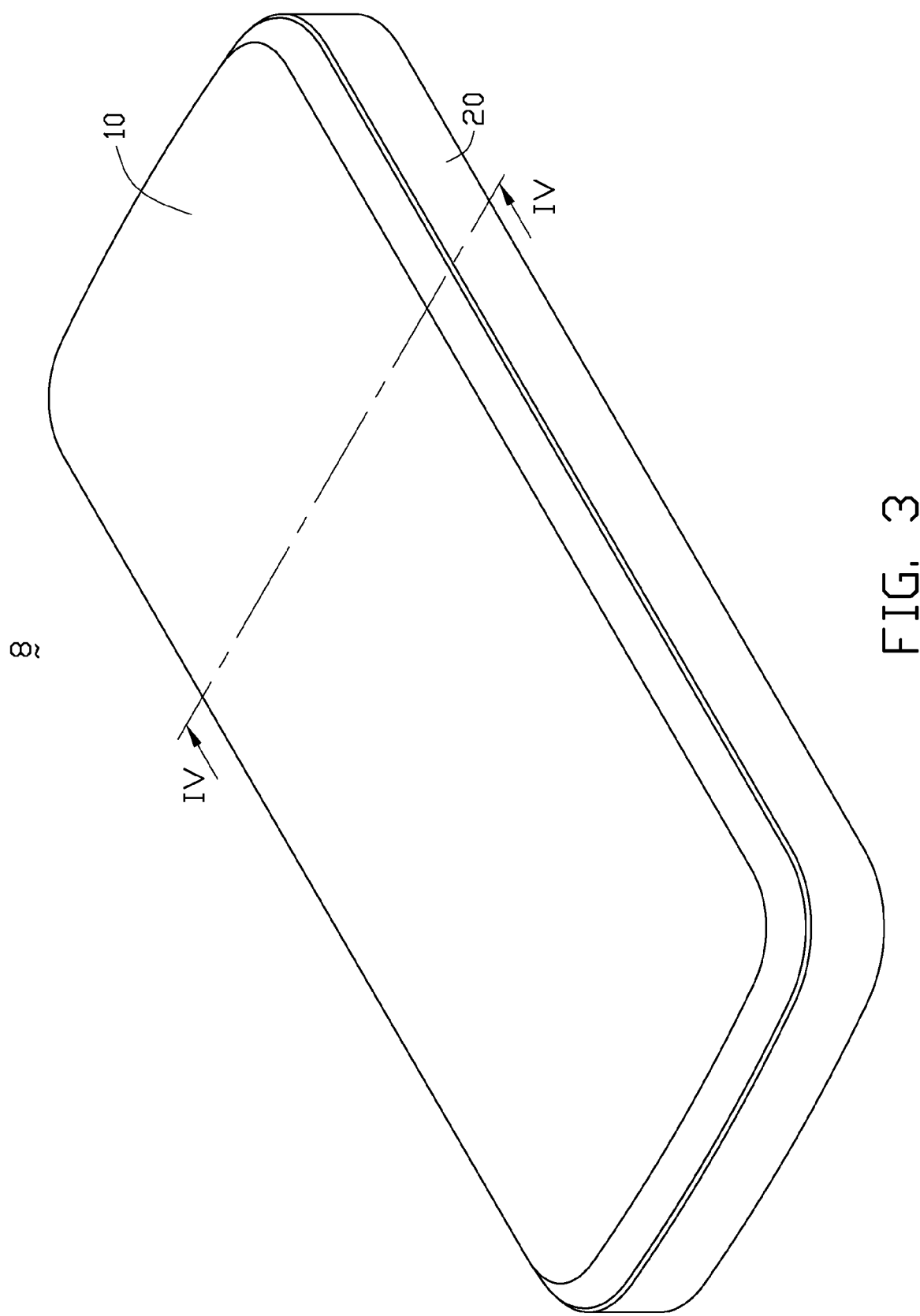
FIG. 3 is an assembled, schematic view of the housing mechanism in FIG. 1.
Figure 4:
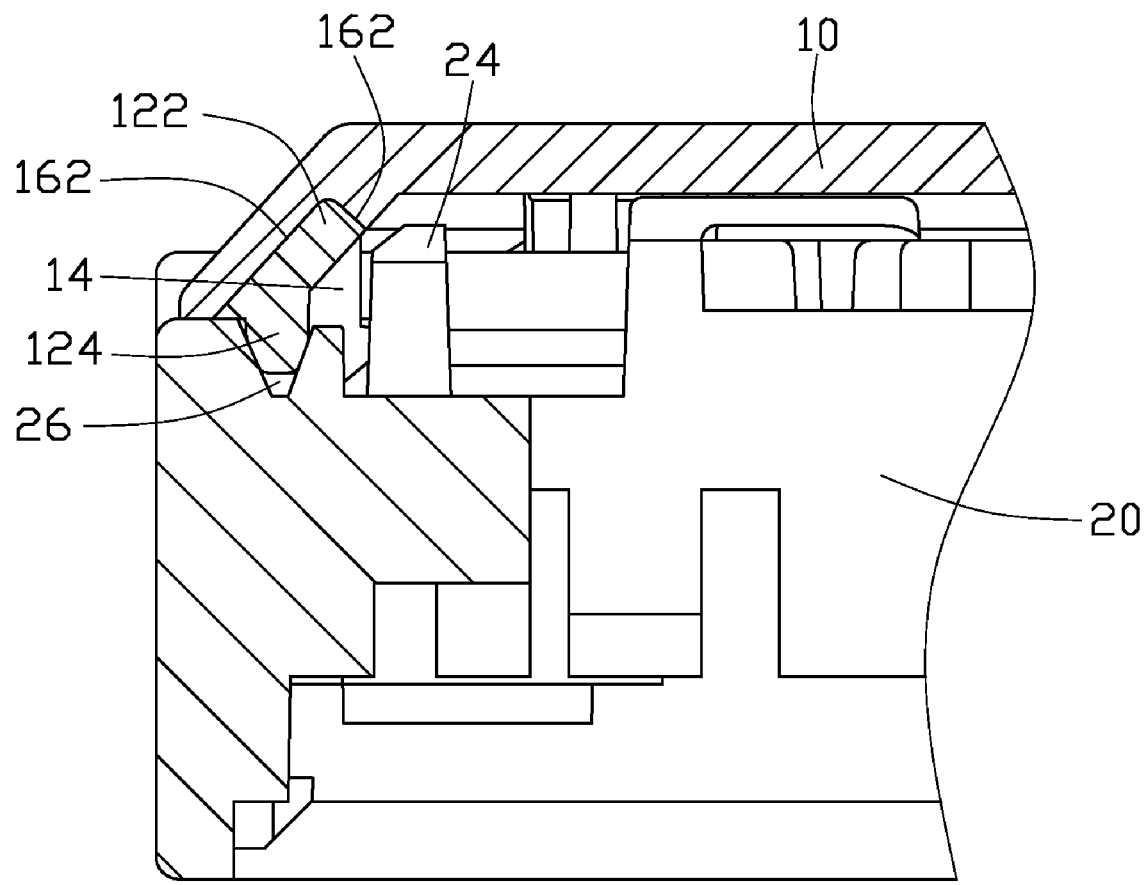
FIG. 4 is a partial, cross-sectional view of the housing mechanism along line IV-IV in FIG. 3.

Referring to FIGS. 3-4, in assembly, the positioning portion 124 of the sealing element 12 is deformed and pressed into the positioning slot 26 of the frame 20. The cover 10 and the frame 20 are locked together by means of the hooks 14 and the projections 24. In this way complete assembly of the housing mechanism 8 is achieved and a sealed inner space in which electronic components of the electronic device are accommodated is formed and surrounded by the sealing element 12 which prevents water or dust from invading the housing mechanism 8.

An exemplary method for making the housing mechanism 8 is provided. Firstly, a cover 10 is molded in a first mold by injection molding. The cover 10 has a receiving slot 16 defined therein and a plurality of hooks 14 formed thereon adjacent to the receiving slot 16. Secondly, an elastic sealing element 12 is molded in the receiving slot 16 of the cover 10 by injection molding. Thirdly, a frame 20 is molded in another mold by injection molding thus obtaining a housing mechanism 8 for an electronic device.

It is believed that the present embodiments and their advantages will be understood from the foregoing description, and it will be apparent that various changes may be made thereto without departing from the spirit and scope of the invention or sacrificing all of its material advantages, the examples here before described merely being preferred or exemplary embodiments of the invention.

What is claimed is:

1. A housing mechanism for an electronic device, comprising:
   a cover having a cover body, a sealing element, and a sidewall, the sidewall being formed around the cover body, a surface of a distal end of the sidewall being recessed to form a receiving slot therein, the sealing element having a connecting portion and a positioning portion connected to the connecting portion, the connecting portion being fixedly received in the receiving slot; and
   a frame having a positioning slot defined therein and the positioning portion of the sealing element being configured for reception in the positioning slot of the frame when the cover is closed to the frame.

2. The housing mechanism as claimed in claim 1, wherein one of the cover and the frame has a hook formed thereon, the other of the cover and the frame has a groove defined therein, and the hook is configured for reception in the groove.

3. The housing mechanism as claimed in claim 1, wherein the distal end of the sidewall of the cover has two inclined surfaces and the two surfaces are inclined at an angle relative to each other thereby forming the receiving slot therebetween.

4. The housing mechanism as claimed in claim 3, wherein the connecting portion of the sealing element has two connecting surfaces, the two connecting surfaces are inclined at an angle relative to each other, and each connecting surface abuts one corresponding inclined surface of the cover.

5. The housing mechanism as claimed in claim 1, wherein the positioning slot of the frame has a substantially V-shaped cross section.

6. The housing mechanism as claimed in claim 5, wherein the positioning portion of the sealing element is substantially pillar-shaped before entering into the positioning slot of the frame and the positioning portion is deformed and pressed into the positioning slot of the frame.

7. The housing mechanism as claimed in claim 1, wherein the connecting portion and the positioning portion of the sealing element are inclined at an angle relative to each other.

8. The housing mechanism as claimed in claim 1, wherein the sealing element is made of an elastic material.

9. The housing mechanism as claimed in claim 8, wherein the sealing element is made of a material selected from the group consisting of rubber and thermoplastic urethanes (TPU).

10. The housing mechanism as claimed in claim 1, wherein the cover and the frame are made of plastic material.

11. The housing mechanism as claimed in claim 10, wherein the plastic material comprises at least one material selected from the group consisting of polyvinyl chloride, polyethylene terephthalate, acrylonitrile-butadiene-styrene, polycarbonate, polyimide, liquid crystal polymer, polyetherimide, polyphenylene sulfide, polysulfone, polystyrene, glycol-modified polyester, and polypropylene.

12. The housing mechanism as claimed in claim 1, wherein the sealing member is integrally formed in the receiving slot of the cover body via insert molding after the cover body and the sidewall are formed.

13. A housing mechanism for an electronic device, comprising:
    a cover comprising a cover body, a sealing element, and a sidewall, the sidewall being integrally formed at a periphery of and surrounding the cover body, an inner surface of the sidewall being recessed to form two inclined surfaces with a receiving slot therebetween, the sealing element being received in the receiving slot and fixedly sandwiched between the two inclined surfaces, the sealing element comprising a positioning portion extending out of the receiving slot and surrounding the cover body; and
    a frame having a positioning slot defined therein, the positioning portion of the sealing element being deformedly and interferentially received in the positioning slot of the frame to seal an inner space configured for accommodating electronic components of the electric device therein, the inner space being formed between the cover and frame and surrounded by the positioning portion and the sidewall.

14. The housing mechanism as claimed in claim 13, wherein the sealing member is integrally formed in the receiving slot of the cover body via insert molding after the cover body and the sidewall are formed.

15. The housing mechanism as claimed in claim 13, wherein a plurality of pairs of interlocking structures is formed between the cover and the frame for locking the cover with the frame.

16. The housing mechanism as claimed in claim 15, wherein each pair of interlocking structure comprises a hook formed on one of the cover and the frame, and a groove defined in the other of the cover and the frame, the hook being configured for reception in the groove.

17. The housing mechanism as claimed in claim 13, wherein the positioning slot of the frame has a substantially V-shaped cross section, and the positioning portion of the sealing element has a substantially pillar-shaped cross section before entering into the positioning slot, the positioning portion capable of being deformed and pressed into the positioning slot.

* * * * *